United States Patent
Wang et al.

(10) Patent No.: US 12,513,025 B2
(45) Date of Patent: Dec. 30, 2025

(54) NETWORK NODE, USER EQUIPMENT, AND METHODS FOR HANDLING CHANNEL FEATURE ESTIMATES ASSOCIATED WITH A RADIO CHANNEL

(71) Applicant: Telefonaktiebolaget LM Ericsson (publ), Stockholm (SE)

(72) Inventors: Zhao Wang, Täby (SE); Karl Werner, Segeltorp (SE); Niklas Wernersson, Kungsängen (SE); Petter Ersbo, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 18/026,374

(22) PCT Filed: Oct. 7, 2020

(86) PCT No.: PCT/SE2020/050955
§ 371 (c)(1),
(2) Date: Mar. 15, 2023

(87) PCT Pub. No.: WO2022/075895
PCT Pub. Date: Apr. 14, 2022

(65) Prior Publication Data
US 2023/0379193 A1  Nov. 23, 2023

(51) Int. Cl.
*H04L 25/02* (2006.01)

(52) U.S. Cl.
CPC ...... *H04L 25/0224* (2013.01); *H04L 25/0212* (2013.01)

(58) Field of Classification Search
CPC ........................ H04L 25/0224; H04L 25/0212
See application file for complete search history.

(56) References Cited

U.S. PATENT DOCUMENTS

2016/0013850 A1\* 1/2016 Zhou .................... H04B 7/0413
375/267
2020/0106507 A1\* 4/2020 Nammi ............... H04L 25/0224

OTHER PUBLICATIONS

International Search Report and Written Opinion of the International Searching Authority, PCT/SE2020/050955, mailed Jun. 28, 2021, 10 pages.
Wang, Fanggang et al., "Cooperative Network Operation Design for Mobility-Aware Cloud Radio Access Network," IEEE Transactions on Wireless Communications, vol. 17, No. 12, Dec. 2018, 15 pages.

\* cited by examiner

Primary Examiner — Natasha W Cosme
(74) Attorney, Agent, or Firm — Sage Patent Group

(57) ABSTRACT

A method performed by a network node for handling channel feature estimates associated with a radio channel between a User Equipment, UE, and the network node in a wireless communications network is provided. The network node obtains a channel feature estimates associated to the radio channel estimated at a first point in time. Data representing the channel feature estimates has a first size. The network node compresses the channel feature estimates at the first point in time by replacing them with updated channel feature estimates that at the subsequent point in time fulfils a respective threshold condition. The data representing the updated channel feature estimates has a second size. The second size is smaller than the first size. The network node then adjusts parameters for a transmission at the radio channel based on the updated channel feature estimates.

15 Claims, 8 Drawing Sheets

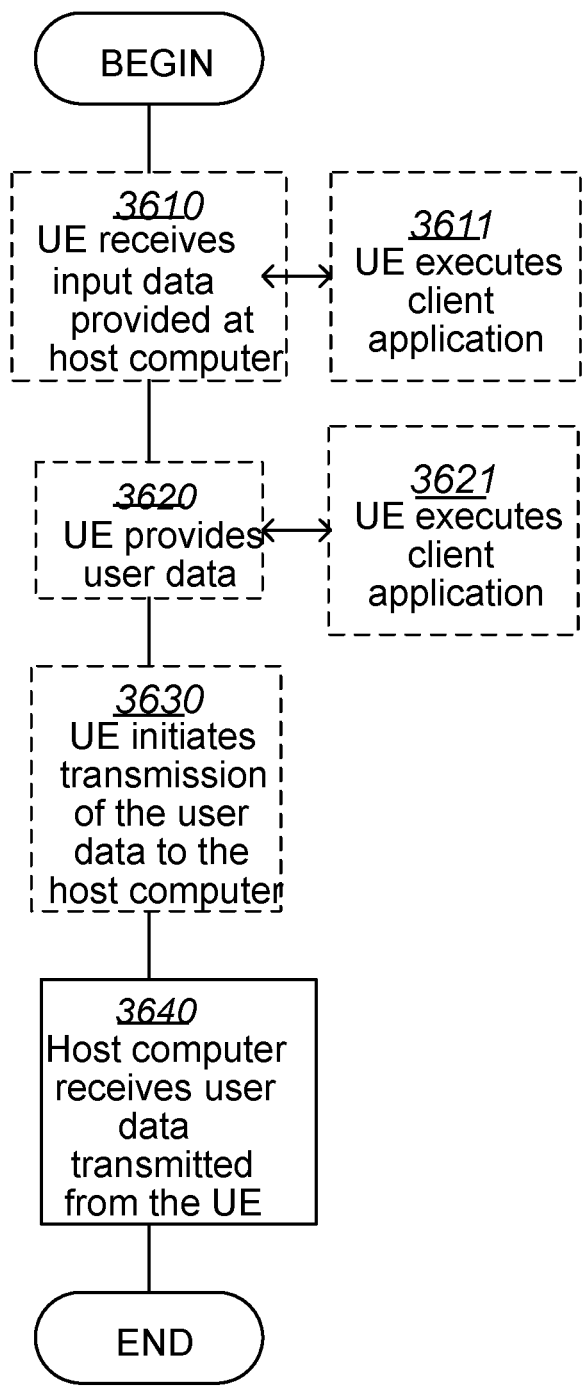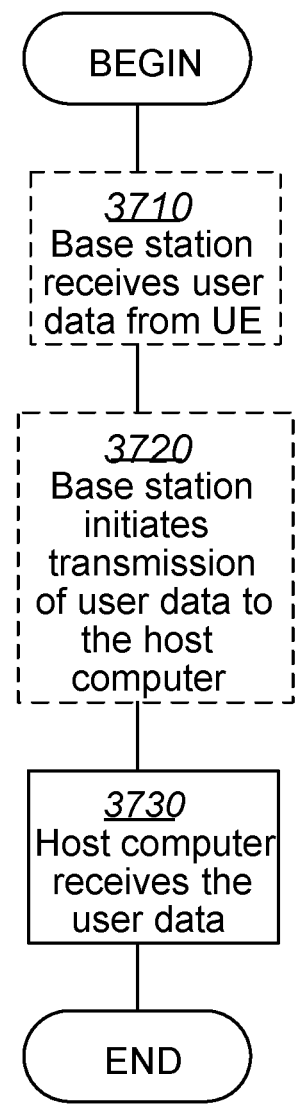
FIG 9
FIG 10

NETWORK NODE, USER EQUIPMENT, AND METHODS FOR HANDLING CHANNEL FEATURE ESTIMATES ASSOCIATED WITH A RADIO CHANNEL

CROSS REFERENCE TO RELATED APPLICATIONS

This application is a 35 U.S.C. § 371 national stage application of PCT International Application No. PCT/SE2020/050955 filed on Oct. 7, 2020, the disclosure and content of which is incorporated by reference herein in its entirety.

TECHNICAL FIELD

Embodiments herein relate to a network node, a User Equipment (UE), and methods therein. In some aspects, they relate to handling channel feature estimates associated with a radio channel between the UE and the network node in a wireless communications network (100), Embodiments herein further relates to computer programs and carriers corresponding to the above methods, DU and UE.

BACKGROUND

In a typical wireless communication network, wireless devices, also known as wireless communication devices, mobile stations, stations (STA) and/or User Equipment (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR) or Next Generation (NG). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Channel State Information (CSI) is key to successful data transmission and reception in multi-antenna systems, such as 5G NR with active antenna systems. CSI is obtained by using feedback such as Precoding Matrix Index (PMI), Rank Indicator (RI), Chanel Quality Indicator (CQI), etc. CSI may further be obtained by using Uplink (UL) measurements, e.g. based on Sounding Reference Signals (SRS) or Demodulation Reference Signal (DMRS). CSI may comprise a channel estimate.

In NR, a CSI acquisition may be categorized into two different ways, namely, by UL SRS, and by CSI feedback based on the Downlink (DL) CSI-Reference Signal (RS) measurement.

SRS are sent in UL from a UE and may be configured in many ways. SRS may be configured to be periodically or aperiodically transmitted. The SRS may also be configured to have a certain period and slot offset in cased of periodic transmission. The sounding bandwidth of SRS may be configured such that the desired bandwidth is sounded. A UE is not necessarily able to send SRSs from all receive antennas in the same slot. It may also be so that the UE is able to sound only a subset of the antennas. There may also be a restriction on how many antennas can be sounded simultaneously. For UEs with antenna switching, the first point in time to obtain the CSI is the point when measurements from all antennas are obtained. For UEs with no antenna switching, e.g., 1Tx 2Rx, the first point in time to obtain the CSI will be the point in time a measure from that particular tx antenna(s) is obtained.

At the base station such as a gNB, based on the received SRS, a sequential of signal processing may be applied such as channel estimation, channel analysing, and precoder calculation for the downlink.

The CSI-RSs are sent in downlink from the base station on certain resource elements distributed in time and frequency. There are Non-Zero Power (NZP) CSI-RSs based on which the UE can estimate the channel from the transmitting base station, and in some cases also interference, and CSI-Interference measurements (IMs) in which resources the UE can estimate the channel and/or interference or beams from other base stations.

The UE measures its configured CSI-RSs and forms a report that is sent to the base station. The report includes PMI, RI, CQI, strongest layer for PTRS mapping purposes (LI), and Layer 1 (L1)-Reference Signal Received Power (RSRP). The CSI-report may be Type-I or Type-II report according to the standard specification 3GPP 38.214, Section 5.2.(2) The type I report may be wideband or frequency selective per sub-band. The type II report is per sub-band. The reports that a UE can send are Radio Resource Control (RRC) configured.

These above two types of CSI acquisition are mainly used for designing efficient transmission schemes. In order to aid the data demodulation at the receiver side, there exists another type of reference signal, namely, the DMRS. DMRS exists in both UL and DL, and it is typically confined within the physical resource, precoded in the same way as the data, and transmitted together with the data with a different resource mapping.

In order to extract channel states from either of these signals, channel estimators estimating the signals based on different algorithms are needed. Designing an efficient and high-performance channel estimator is a research and development focus in practice. On the other hand, after obtaining the channel estimates, how to efficient use it for either transmission or reception purpose, and how to efficiently store this information are also challenging considering practical constraints such as computational capacity and memory. In this draft, the later aspect is focused.

A conventional usage of CSI is in a one-shot fashion, which utilizes the current channel estimates or CSI feedback until a new CSI is obtained via different forms. This introduces the following deficiencies:

Insufficient to track channel dynamics in time. This is particularly important for demodulating data streams and designing precoding and/or beamforming schemes for high-mobility UEs. To track channel dynamics means that the transmission format, including the precoding, is adapted to changes in the channel over time.

Insufficient to predict channel dynamics in time. For some use cases, triggering CSI reporting may take some time until a new CSI is obtained at gNB. To predict channel dynamics means that CSI used for determining transmission format is obtained by extrapolating from measurements obtained at an earlier point in time To reduce system latency, channel prediction may be used for data transmission as the previous one-shot CSI is outdated.

SUMMARY

As a part of developing embodiments herein a problem was identified by the inventors and will first be discussed.

Motivated by the above deficiencies mentioned above, storing the previous CSI may be a natural pre-step to introduce channel tracking and prediction.

A related issue is that storing the CSI is expensive in a practical system in terms of memory. This is because the amount of CSI to store scales with the bandwidth and the number of antennas. The large cost of storing CSI for a single UE with legacy methods means that CSI can be stored for only a small set of UE. This creates the following problems:

A CSI may not be available when a transmission starts, because it was not stored, or was stored but then removed.

An SRS may need to be re-obtained. This comes with a cost in terms of system resources and also computational resources.

How to efficiently compress the channel estimates and/or feedback and cope with the channel estimator structure as well as the potential tracking and prediction algorithm lacks in prior art.

A related problem is how to efficiently transmit CSI over a Fronthaul (FH). Here a CSI may be estimated in the Radio Unit (RU) and then transmitted over the front haul to the Baseband Unit (BU) of a base station. Also, here the problem of efficiently compress the channel estimates and/or feedback is central since the FH typically is bandwidth limited.

An object of embodiments herein is to provide an improved way for handling channel feature estimates in a wireless communications network.

According to an aspect, the object is achieved by method performed by a network node for handling channel feature estimates associated with a radio channel between a UE, and the network node in a wireless communications network. The network node obtains one or more channel feature estimates associated with the radio channel estimated at a first point in time. The data representing the one or more channel feature estimates has a first size. At each of one or more successive points in time, the network node compresses the one or more channel feature estimates at the first point in time by replacing them with updated one or more channel feature estimates that at the subsequent point in time fulfils a respective threshold condition. The data representing the updated one or more channel feature estimates has a second size. The second size is smaller than the first size. The respective threshold reflects any one or more out of: a gradual aging of the one or more channel features, a probability that the UE will be scheduled within a time limit for the radio channel, and an available bandwidth at a FH of the network node. The network node then decides whether or not to adjust parameters for a transmission at the radio channel based on the updated one or more channel feature estimates.

According to another aspect, the object is achieved by a network node configured to handle channel feature estimates associated with a radio channel between a UE, and the network node in a wireless communications network. The network node is further configured to:

Obtain one or more channel feature estimates associated with the radio channel estimated at a first point in time, wherein data representing the one or more channel feature estimates is adapted to have a first size, at each of one or more successive points in time, compress the one or more channel feature estimates at the first point in time by replacing them with updated one or more channel feature estimates that at the subsequent point in time is adapted to fulfil a respective threshold condition, wherein data representing the updated one or more channel feature estimates is adapted to have a second size, which second size is adapted to be smaller than the first size, which respective threshold is adapted to reflect any one or more out of:

a gradual aging of the one or more channel features, a probability that the UE will be scheduled within a time limit for the radio channel, and an available bandwidth at a FH of the network node, adjust parameters for a transmission at the radio channel based on the updated one or more channel feature estimates.

In this way, channel feature estimates are updated in a way that enables reduction of the amount of information used to represent the channel feature estimates at successive points in time, also referred to as channel feature estimate compression. This results in an improved way for handling channel feature estimates in a wireless communications network.

BRIEF DESCRIPTION OF THE DRAWINGS

FIGS. 7 to 10 are flowcharts illustrating methods implemented in a communication system including a host computer, a base station and a user equipment.

DETAILED DESCRIPTION

An example of embodiments herein relates to a coherent channel-state-information compression method.

In some examples of embodiments herein it is provided a way to represent channel feature estimates such as e.g. CSI in a format that enables gradually reduction of the amount of information used to represent the CSI as time goes by, also referred to as channel feature estimate compression.

Figure 2:
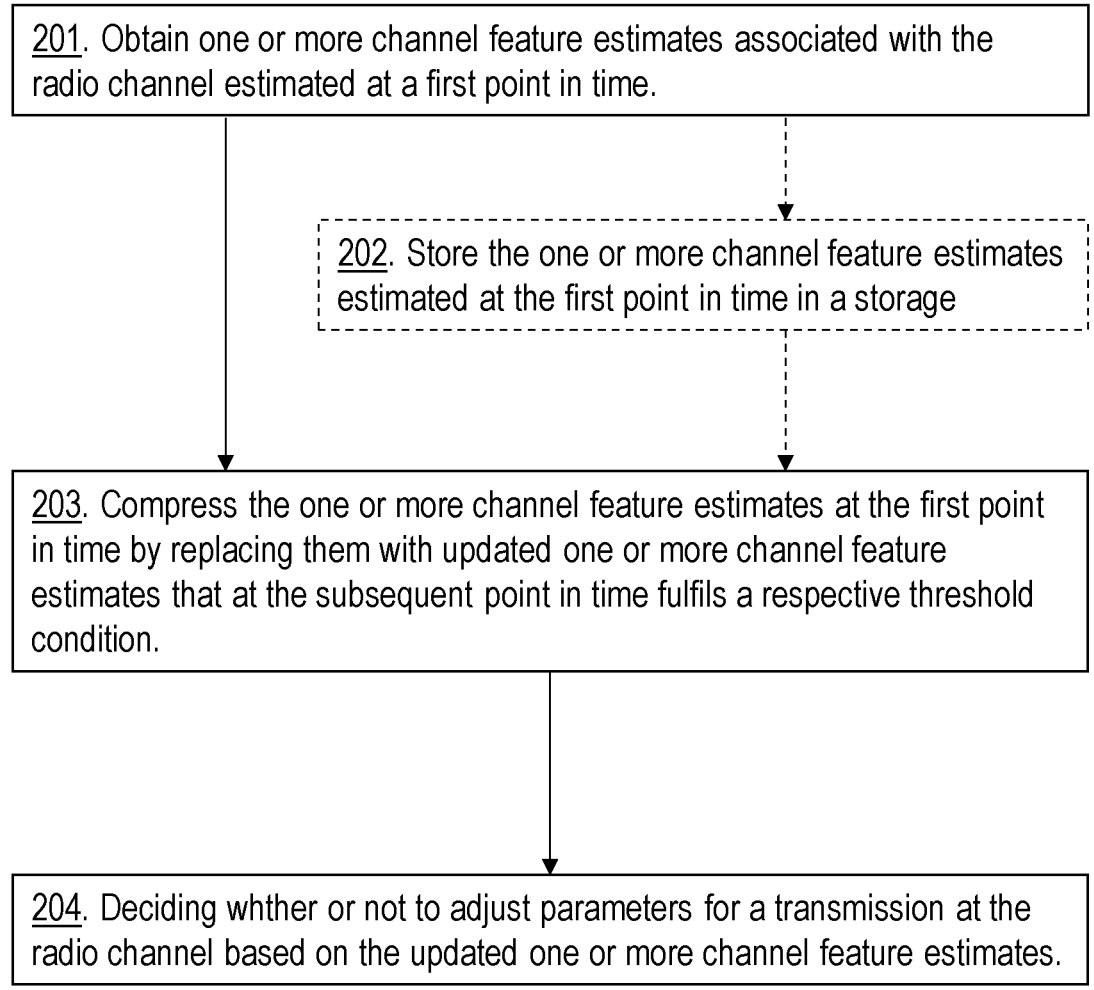
FIG. 2 is a flow chart depicting embodiments of a method in a network node.

FIG. 2 is a schematic overview depicting a wireless communications network 100 wherein embodiments herein may be implemented. The wireless communications network 100 comprises one or more RANs and one or more CNs. The wireless communications network 100 may use 5 Fifth Generation New Radio, (5G NR) but may further use a number of other different Radio Access Technologies (RAT)s, such as, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. It may also be applied to dedicated backhaul technologies.

Network nodes, such as a network node 110, operate in the wireless communications network 100. The network node 110 may provide radio access in one or more cells. This may mean that the network node 110 provides radio coverage over a geographical area by means of its antenna beams. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a radio device within the cell served by network node 110 depending e.g. on the radio access technology and terminology used.

The network node 110 may in some embodiments comprise a BU connectable to one or more RUs via a respective fronthaul.

UEs such as the UE 120 operate in the wireless communications network 100. The UE 120 may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more RANs to one or more CNs. It should be understood by the skilled in the art that the UE 120 relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Figure 1:
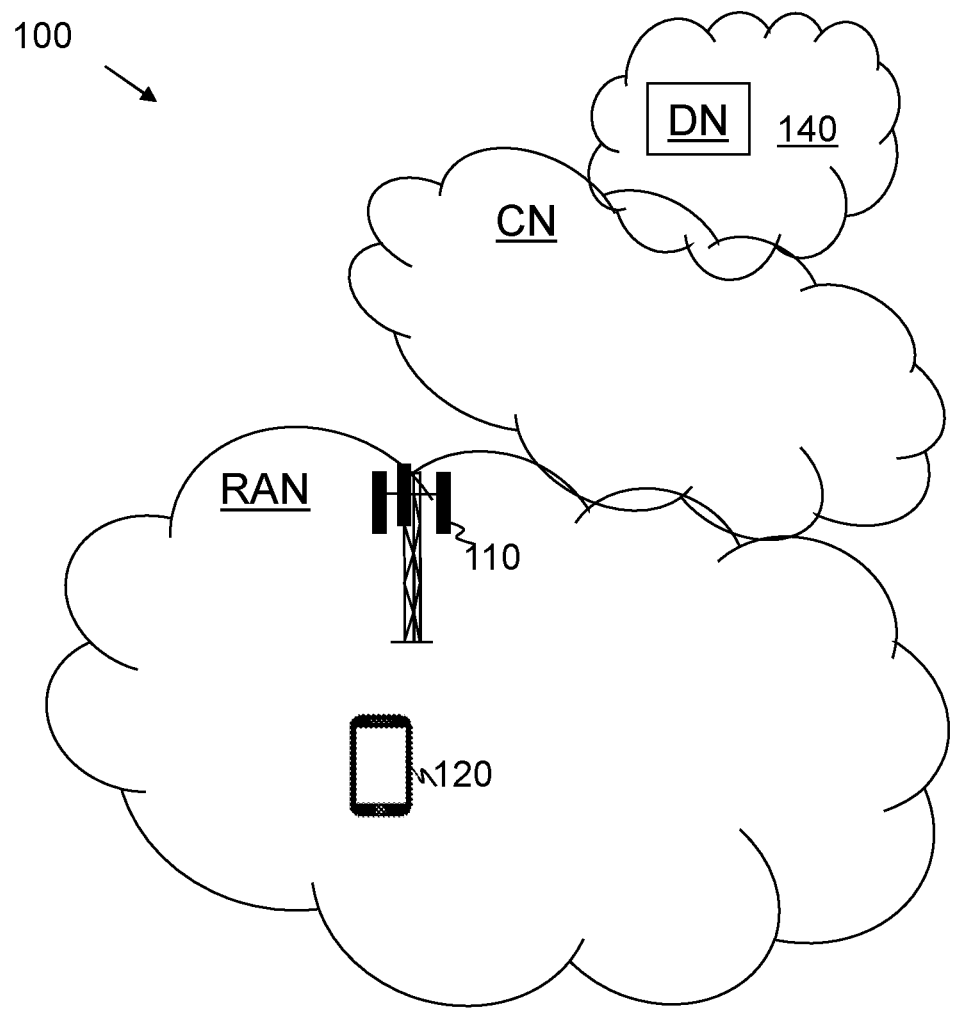
FIG. 1 is a schematic block diagram depicting embodiments of a wireless communication network.

Methods herein may e.g. be performed by the network node 110. As an alternative, a Distributed Node (DN) and functionality, e.g. comprised in a cloud 140 as shown in FIG. 1, may be used for performing or partly performing the methods.

The network node 110 communicates with the UE 120 over a channel. The quality of the channel is estimated by the UE 120 and or the network node 110.

As mentioned above, some examples of embodiments herein provide a method to represent channel feature estimates such as e.g. CSI, of the channel in a format that enables gradually reduction of the amount of information used to represent the CSI as time goes by. This may be referred to as channel feature estimate compression.

One implementation may be to store channel feature estimates such as e.g. CSI as a set of beam and/or antenna tap features. Reduction may then be done by removing features with lowest power.

The wording antenna tap when used herein means channel impulse response amplitude and phase, as measured between a pair of antennas, at a certain delay relative to a reference point A set of tap features may comprise a set of coefficients of a sampled impulse response related to a pair of antennas. A set of beam features may comprise coefficients of a sampled channel impulse response related to the channel in a beam.

Triggers for a gradual reduction of channel feature estimates such as e.g. CSI storage space and hence accuracy may be time, UE 120 activity, total size of the channel feature estimate storage e.g. in bytes, or/and allowed size to represent the channel feature estimates such as e.g. CSI.

An efficient channel feature estimate compression scheme that copes with the state of art channel estimator algorithms is provided according to embodiments herein, which in some embodiments gracefully reflects a degradation of the channel feature estimate quality such as e.g. CSI quality. By reflecting said degradation, it is possible to make a tradeoff between channel feature estimate quality such as e.g. CSI quality and amount of information required to represent the channel feature estimate. The provided channel feature estimate compression algorithm is low complex in terms computation and memory usage.

In some embodiments channel tracking and prediction in time performed. In these embodiments a graceful degradation of the channel feature estimates such as e.g. CSI are stored so that storage requirements shrink as time progresses. This is at the expense of an acceptable degradation in the quality of the channel feature estimates, which may anyway be smaller than the degradation due to that the channel feature estimates are ageing. The compression methods according to embodiments herein may be seen as an adaptive filter in time applied to the channel feature estimates obtained at different time slots.

Another application of embodiments herein is to perform transmission of the compressed channel feature estimates such as e.g. CSI over a bandlimited fronthaul. In for instance a switched fronthaul the available bandwidth may vary with the load at the fronthaul and consequently the available bandwidth at a first time instant may be different compared to the available bandwidth at a successive time instant. A time instant may also be referred to as a point in time herein. By applying embodiments herein, the graceful degradation of the channel feature estimates may be exploited to match the amount of information required to represent the channel feature estimates such as e.g. CSI to the available bandwidth at the fronthaul.

Embodiments herein may provide following advantages:
Low complexity in terms of computation and memory in the base station 110.

Easy to implement since well aligned with the state of art channel estimator structure in network node 110 e.g. in its radio node receiver, and very little extra computations are needed.

Enable channel feature estimation enhancement by providing the stored channel information to a predictor/estimator Enable gradual reduction of storage requirement for channel feature estimates such as e.g. CSI for the UE 120 to reflect a gradual ageing of the channel feature estimate and also a declining probability of the UE 120 being scheduled ahead.

A possibility to better transmit and receive data during the time period after CSI is triggered and but before it is obtained This in turn will shorten the system latency and increase throughput.

FIG. 2 shows example embodiments of a method performed by the network node 110 for handling channel feature estimates associated with a radio channel between the UE 120 and the network node 110 in the wireless communications network 110.

The method comprises one or more of the following actions, which actions may be taken in any suitable order. Actions that are optional are marked with dashed boxes in the figure.

Action 201

According to an example scenario, the network node 110 is or about to communicate with the UE 120 over a radio channel. The network node 110 needs channel feature estimates reflecting the quality of the radio channel.

The network node 110 obtains one or more channel feature estimates associated with the radio channel estimated at a first point in time. Data representing the one or more channel feature estimates has a first size.

The one or more channel feature estimates may e.g. be obtained by any one out of: Receiving the one or more channel feature estimates from the UE 120, or estimating the one or more channel features of a signal from the UE 120.

Action 202

In some embodiments, the network node 110 stores the one or more channel feature estimates estimated at the first point in time in a storage. At the first point in time, the storage requirements of the one or more channel feature estimates are for the first size.

Action 203

At successive points in time, the one or more channel feature estimates will be compressed such that their size become decreased. At each of one or more successive points in time, the network node 110 compresses the one or more channel feature estimates at the first point in time. This is performed by replacing them with updated one or more channel feature estimates that at the subsequent point in time fulfils a respective threshold condition. To fulfil a respective threshold condition e.g. means to exceeds or be below a respective threshold.

This means that in an example scenario, represented K one or more channel feature estimates at a first subsequent point in time is a subset of represented N one or more channel feature estimates at the first point in time.

Further, represented N one or more channel feature estimates at a second subsequent point in time is a subset of represented Q one or more channel feature estimates at the first subsequent point in time.

The data representing the updated one or more channel feature estimates has a second size, which second size is smaller than the first size. The respective threshold reflects any one or more out of:—A gradual aging of the one or more channel features, —a probability that the UE 120 will be scheduled within a time limit for the radio channel, and—an available bandwidth at a fronthaul (FH) of the network node 110.

The one or more successive points in time may occur when any one or more out of:

being triggered at periodically subsequent points in time, a RRC state transition of the UE 120 is performed, a timer related to the age of the channel estimate to the UE 120 is exceeded, and a remaining space on the storage is below a threshold.

In some embodiments wherein a decreased storage volume requirement is wanted for the channel feature estimates, the respective threshold reflects a gradual aging of the one or more channel features at the subsequent point in time. In these embodiments, the network node 110 has stored the one or more channel feature estimates estimated at the first point in time in the storage, see Action 202. In these embodiments, the compressing of the one or more channel feature estimates by replacing them is performed by replacing the one or more channel feature estimates stored in the storage with the updated one or more channel feature estimates that at the subsequent points in time fulfils the respective threshold condition. This results in a decreased storage volume requirement for the updated one or more channel feature estimates.

In these embodiments, the respective threshold may further reflect a probability that the UE 120 will be scheduled within a time limit for the radio channel.

The at least one respective threshold conditions may be represented by any one out of: Exceeding a power threshold, and being below a bandwidth limit for transmitting the updated channel feature estimates from an RU to a BU over a fronthaul in the network node 110.

In some other embodiments a decreased amount of data is wanted for transmitting the channel feature estimates over a fronthaul with limited bandwidth. The at least one of the respective threshold condition may then be represented by a bandwidth limit for transmitting the updated channel feature estimates from the RU to the BU over the fronthaul in the network node 110. In these embodiments, the compressing of the one or more channel feature estimates by replacing them may be performed by:

Dividing the one or more channel feature estimates at the first point in time in two or more parts.

Replacing the one or more channel feature estimates at the first point in time with the first part that at the subsequent points in time fulfils the threshold condition and at the subsequent point in time sending the first part of the channel feature estimates over the fronthaul, and replacing the first part with the second part that at the subsequent point in time fulfils the threshold condition and then at a third point in time sending the second part of the channel feature estimates over the fronthaul.

In the fronthaul application, the strongest features may first be sent at the subsequent point in time, and then at a later point in time, here referred to as the third point in time, features that were not sent in the subsequent point in time are sent send as they are weaker. The network node 110, such as the receiver in the network node 110, would then combine the two set of features, rather than replacing the first set with the second.

Action 204

The network node 110 decides whether or not to adjust parameters for a transmission at the radio channel based on the updated one or more channel feature estimates.

The embodiments described above will now be further explained and exemplified. The example embodiments described below may be combined with any suitable embodiment above.

Figure 3:
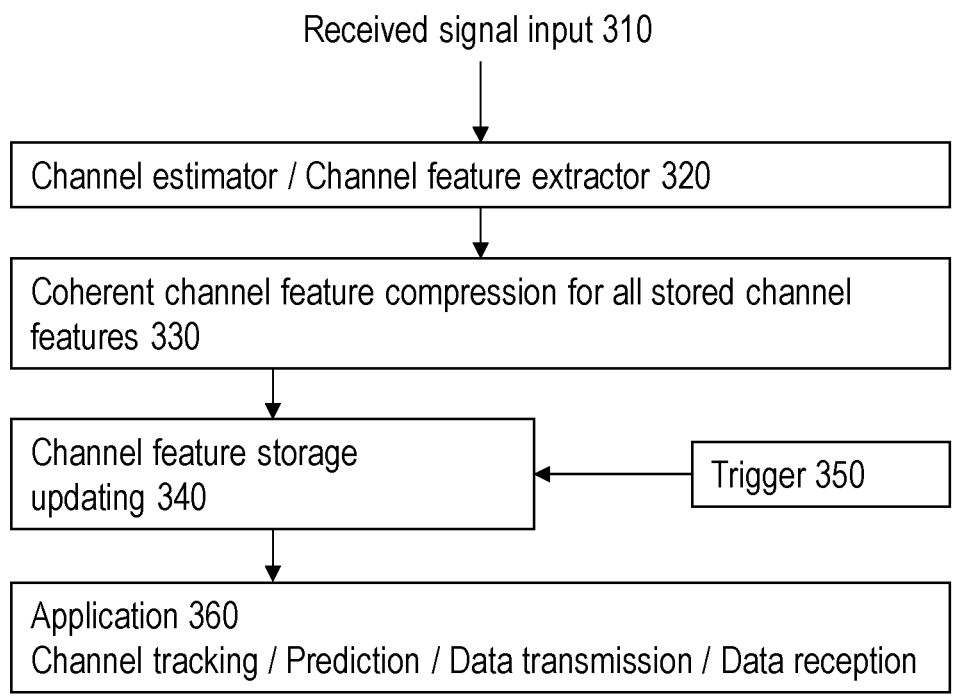
FIG. 3 is a flow chart depicting an example embodiment herein.

To briefly introduce embodiments herein, a functional block diagram is presented as follows and together with FIG. 3, to illustrate its functional relation with other units, in practice in the network node 110, according to some example embodiments.

In some embodiments, a received signal input 310 may be provided in the network node 110. This is for obtaining the one or more channel feature estimates associated with the radio channel estimated at a first point in time.

A channel estimator and/or feature extractor 320 may be provided in the network node 110. This is used for extracting the one or more channel features.

A channel estimator and/or feature extractor 330 is for performing compression of the one or more channel feature estimates.

The channel estimator and/or feature extractor 330 may be a linear transform over antennas and subcarriers onto an antenna tap/beam domain set of coefficients (aka features). The channel estimator and/or feature extractor 330 amounts to select significant coefficients, e.g. channel feature estimates with power above a threshold. The word coefficient when used herein means a complex scalar quantity at the output of transforms over frequency (subcarriers) and/or antennas.

A channel feature storage updating 340 may be provided in the network node 110. The channel feature storage updating 340 is for replacing the one or more channel feature estimates with updated one or more channel feature estimates that at the subsequent point in time fulfils a respective threshold condition.

The channel feature storage updating 340 amounts to select a smaller set of taps based on a (higher) threshold for storage.

A trigger 350 may be provided in the network node 110. The trigger 350 is for triggering the compression of the one or more channel feature estimates at the first point in time by replacing them with updated one or more channel feature estimates that at the subsequent point in time fulfils a respective threshold condition.

The trigger 350 may e.g. provide triggers periodically, depending of UE 120 RRC state transition, based on a UE 120 activity timer or based on remaining space on the channel feature estimate storage.

An application 360 may be provided in the network node 110. The application 360 is for adjusting parameters, if decided so, for a transmission at the radio channel based on the updated one or more channel feature estimates. The application 360 may comprise a reverse of the linear transform, using the updated one or more channel feature estimates, and subsequent antenna weight computation.

In some embodiments, a system storing a representation of the one or more channel feature estimates, such as e.g. CSI, are considered together with the radio channel changing with time. This means that the one or more channel feature estimates, stored will gradually become inaccurate as it ages. This is in opposite to prior art where the CSI is stored unchanged until it is removed from the storage in a base station.

Examples of embodiments herein provide a way to store the one or more channel feature estimates, such as e.g. CSI efficiently with high accuracy, and a way to make stored channel feature estimates coarser. This saves storage but also reflects the fact that the radio channel ageing will any way make the channel feature estimates inaccurate, so no need to store the channel feature estimates in a very detailed way.

In some alternative embodiments, the fronthaul with limited and time varying bandwidth is considered. The bandwidth is assumed known, or estimated, and a representation of the one or more channel feature estimates, such as e.g. CSI is transmitted from the RU to the BU over the fronthaul in the network node 110. If the amount of information to represent the channel feature estimates is larger than the bandwidth of the fronthaul, the channel feature estimates are made coarser. By doing so the amount of information to represent the channel feature estimates is reduced, at the cost of reduced quality of the channel feature estimates.

Furthermore, it is natural that the amount of information required to represent the channel feature estimates varies with for instance number of UE antenna ports at the UE 120, as well as channel bandwidth. In some situations it may however be preferable to have a fixed size of the data representing the one or more channel feature estimates, such as e.g. CSI, for instance to enable easy planned storage in a computer memory. One embodiment is applied in such a situation to convert the data representing the channel feature estimates to a preferred size.

Implementation

In this section, an Implementation of an embodiment for an uplink receiver in the network node 110 based on an SRS channel estimator is presented. This is an example of a detailed implementation based on the uplink SRS channel estimator.

Considering time index t, let the column vector $\dot{h}[t]$ with dimension N by 1 represent the raw channel feature estimates at each resource element. Note that $\dot{h}[t]$ represents the raw channel feature estimates at one receiving antenna port or one virtual antenna port, e.g., in beam or other projected subspaces of the received signal instead of antenna domain.

Note that, while the exposition uses single virtual antenna as example, embodiments herein may be applied to multiple antennas. In this case N may be an index over antennas and resource elements, e.g. $N=K*M$ where K is the total number of resource elements, and M is the total number of antennas, or, equivalently, beams which are obtained using a linear transform over the signal per antenna.

Algorithm Description of an Example Embodiment in the in the Network Node 110

1. Applying an invertible transform over $\dot{h}[t]$, which may be represented by $\ddot{h}[t]=D\dot{h}[t]$, where D is an N by N invertible matrix. A state of art solution for D is the DFT matrix or the DCT matrix, both of which are linear transforms. $\ddot{h}[t]$ then represents the effective channel taps in the corresponding transformed domain. The wording channel taps when used herein means a coefficient or feature after the invertible transform.

The one or more channel feature estimates is here represented by $\ddot{h}[t]$, or a subset of the coefficient of $\ddot{h}[t]$.

This step relates to how to obtain of the one or more channel feature estimates associated with the radio channel of Action 201 described above.

Note that in the multiple antenna case, the linear transform is typically applied over subcarriers related to a single beam and/or antenna, transform is applied over resource elements separately per antenna and/or beam. This is removed from the notation for brevity.

This step may be implemented as part of the channel estimator.

2. A channel tap selection criterion is applied on top of $\hat{h}[t]$ for denoising and interference rejection. Let a matrix S with dimension N by N to represent the selection operation, whose diagonal entries are 0 or 1, and otherwise all zero. Note that the 0 and 1 positions are determined by a criterion which stands as the core of the state-of-the-art channel estimator. A commonly used criterion may be based on a maximum likelihood principle, e.g., the AIC.

$$\dddot{h}[t] = S\hat{h}[t]$$

$\dddot{h}[t]$ is then the estimated channel impulse response in the transformed domain. Note that the tap selection criteria may be applied jointly over beams/antennas, or separately per beam/antenna.

The one or more channel feature estimates is here represented by $\dddot{h}[t]$.

This step also relates to the obtaining of the one or more channel feature estimates associated with the radio channel of Action 201 described above. This step may be implemented as part of the channel estimator.

3. Channel feature compression. This step relates to Action 203, compressing the one or more channel feature estimates at the first point in time by replacing them with updated one or more channel feature estimates that at the subsequent point in time fulfils a respective threshold condition.

Let the non-negative integer L represent the number of non-zero entries in the vector $\dddot{h}[t]$. $\dddot{h}[t]$ may be represent as:

$$\dddot{h}[t] = [0, \ldots, \dddot{h}_1[t], \ldots, \dddot{h}_l[t], \ldots, \dddot{h}_L[t], \ldots, 0]^T$$

where $\dddot{h}_l[t]$ for l=[1:L] represents the non-zero entries in the vector. For clarity, let the L by 1 vector $\dddot{h}_L[t] = [\dddot{h}_1[t], \ldots, \dddot{h}_l[t], \ldots, \dddot{h}_L[t]]^T$ be the collection of the nonzero channel taps. From an encoding perspective $\dddot{h}[t]$ May be represented as an encoded version of $\dddot{h}_L[t]$ combined with a bit map representing the positions of the non-zero values in $\dddot{h}[t]$. Alternatively, since there would be $$\binom{N}{L} = \frac{N!}{L!(N-L)!}$$

different bitmaps possible one can represent them using $$\left\lceil \log2\left(\binom{N}{L}\right) \right\rceil$$

bits, for instance using a combinatorial number system. Note that this encoding also may be carried out at least partly over beams and/or antennas, or separately per beam and/or antenna.

The compression scheme works as follows:
a. Sort $\dddot{h}_L[t] = [\dddot{h}_1[t], \ldots, \dddot{h}_l[t], \ldots, \dddot{h}_L[t]]^T$ in an descending (or equivalently ascending order, w.l.o.g., we only consider descending order here) according to the magnitude of $\dddot{h}_l[t]$ for l=[1:L]. We represent the sorted vector as $\dddot{h}_{\pi_L}[t] = [\dddot{h}_{\pi_L}[t], \ldots, \dddot{h}_{\pi_l}[t], \ldots, \dddot{h}_{\pi_L}[t]]^T$ where $\pi_l$ for l=[1:L] represents the permuted index for the l-th largest channel tap in terms of magnitude. Here the values of the one or more channel feature estimates at the first point in time are sorted in a descending or equivalently ascending order.

b. Shorten the vector $\dddot{h}_{\pi_L}[t]$ to be length $L_0 \leq L$ by only keeping the $L_0$ most significant channel taps, e.g., [$\dddot{h}_{\pi_L}[t], \ldots, \dddot{h}_{\pi_{L_0}}[t]$], where $L_0$ is a design parameter depending on the memory capacity and doppler, SNR estimation of the channel among other things. Here, the one or more channel feature estimates that at the first point in time is replaced with updated one or more channel feature estimates that at the subsequent point in time fulfils a respective threshold condition.

c. For each kept entry $$\dddot{h}_{\pi_l}[t] = |\dddot{h}_{\pi_l}[t]| e^{-i\theta_{\pi_L}},$$

the following tuple $(\pi_l, |\dddot{h}_{\pi_l}[t]|, \theta_{\pi_l})$ is quantized to satisfy the memory constraint, i.e. thereby the second size of the updated one or more channel estimates represents a decreased storage volume requirement. It is noted that permutation indexes $\pi_l$ may be encoded separately by for instance using Lehmer encoding. $f_{t,l} = (\pi_l, |\dddot{h}_{\pi_l}[t]|, \theta_{\pi_l})$ for l=[1: $L_0$] are the compressed channel feature at time index t. Let $f_{t,L_0} = [f_{t,1}, f_{t,2}, \ldots, f_{t,L0}]$ be the vector of the compressed channel feature at time index t with the number of kept channel taps being $L_0$. In addition, a representation of the remaining non-zero positions corresponding to $f_{t,L_0}$ using $$\left\lceil \log2\left(\binom{N}{L_0}\right) \right\rceil$$

bits may also be encoded. In an alternative embodiment an inverse operation of the permutation may be carried out on the coefficients of $f_{t,L_0}$, this would imply that there is no longer a need to encode the permutation indexes $\pi_l$ and only the positions of the non-zero values would be encoded.

4. Channel feature storage updates. Assume that at the time index t, such as e.g. the first point in time, there exists a collection of channel features, e.g. the one or more channel feature estimates having a first size, stored in the specific memory $\{f_{t-1,L_0}, f_{t-2,L_1}, \ldots, f_{t-\tau,L_{\tau-1}}\}$, in which $L_0 >= L_1 >= \ldots >= L_{\tau-1} > 0$ are design parameters. Here it is assumed the timing index different to be 1 for brevity in presentation. The updating scheme at the subsequent point in time works as follows:

a. for each entry in $f_{t-i,L_{i-1}} \in \{f_{t-1,L_0}, f_{t-2,L_1}, \ldots, f_{t-\tau,L_{\tau-1}}\}$ and $i \neq \tau$, shorten the number of the tuples to be $L_i$ by only keeping the $L_i$ largest tuple entries with respect to the magnitude of the channel tap in the tuple, i.e., $|\dddot{h}_{\pi_l}[t-i]|$, for l=[1:$L_{i-1}$]. Also update the encodings indicating the positions of the non-zero coefficients.

b. for i=$\tau$, $f_{t-\tau,L_{\tau-1}}$ is removed from the collection.

c. push the new feature tuple vector $f_{t,L_0}$ to the collection. The new stored channel information is as follows:

$$\{f_{t,L_0}, f_{t-1,L_1}, \ldots, f_{t-\tau+1,L_{\tau-1}}\},$$

which is updated at the subsequent point in time with the new channel information at time t and further compressed for the history storage.

Note that an implementation of the storage data structure may be a First In First Out (FIFO), a queue, or other linear data containers.

Applying an Invertible Transform

The transform may be implemented using a Fast Fourier transform, forming the matrix D is hence not the only embodiment.

Shorten the Vector Including Trigger to Shorten

Note that shortening the feature vector may be done through comparing the features to a threshold, e.g. such as to fulfil the respective threshold condition.

Compressing the one or more channel feature estimates such as e.g. the shortening of the feature vectors, may be triggered periodically e.g. so that the number of stored features decreases over time.

It may also be performed in response to an increase in the size of the totally stored data so that a constraint of memory usage is met.

It may be done in response to the UE 120 is leaving an RRC-ACTIVE state.

It may be in response to a timer that may be reset as soon as the UE 120 is active, i.e. scheduled, or transmits a scheduling request.

Sort

Note that sorting and finding the L strongest features may be equivalent to selecting features that have power above a certain threshold. Actual sorting may or may not be required.

Also note that, in a multi-antenna system, the sorting may be done per antenna and/or beam, or jointly over all antennas in the network node 110.

The sorting may be done after shortening of the vector. This may be beneficial for performance if many elements are removed from the vector.

Channel feature compression may amount to selecting the features which are deemed to contain e.g. be dominated by, signal energy, not only noise.

Embodiment $R(L_0)$

In some alternative embodiments, a function $R(L_0, t)$ is derived which represents the amount of information required to encode $f_{t,L_0}$. Typically, $R(L_0, t)$ may be understood to be the number of bits for the encoded sequence after encoding $f_{t,L_0}$. It is likely that $R(L_0, t)$ will be independent of time so an alternative way to write this function may be $R(L_0)$, although it may also depend on other variables such the number of UE antenna ports etc. The function $R(L_0)$ may then be used to decide an appropriate choice of $L_0$ when for instance transmitting the information representing the CSI over a bandlimited fronthaul. If for instance the fronthaul has the bandwidth $R_{FH}$ available, i.e., a constraint on the number of bits, one could choose $L_0$ as large as possible while fulfilling the condition $R_{FH} \geq R(L_0)$.

Embodiment Multiple Steps Encoding

In yet some other embodiments, encoding of $f_{t,L_0}$ is performed in multiple steps by divide $$[\tilde{h}_{\pi_1}[t], \ldots, \tilde{h}_{\pi_{L_0}}[t]]$$

into multiple parts. Consider for instance the case when the data is divided into two parts:

$$[\tilde{h}_{\pi_1}[t], \ldots, \tilde{h}_{\pi_{L_{p1}}}[t]] \text{ and } [\tilde{h}_{\pi_{L_{p1}+1}}[t], \ldots, \tilde{h}_{\pi_{L_0}}[t]].$$

Here $$[\tilde{h}_{\pi_1}[t], \ldots, \tilde{h}_{\pi_{L_{p1}}}[t]]$$

may be encoded, jointly with a representation of the positions of the non-zeros positions, in a first representation of the channel feature estimates here the CSI.

$$[\tilde{h}_{\pi_{L_{p1}+1}}[t], \ldots, \tilde{h}_{\pi_{L_0}}[t]]$$

can then be encoded, jointly with a representation of the positions of the non-zeros positions, in a second representation of the CSI. This representation will enable a decoding with the properties that Decoding from the first representation of the CSI will correspond to a coarse representation of the CSI.

Decoding from the first and second representation of the CSI will correspond to a refined representation of the CSI.

Consequently, this representation of the CSI be utilized in the above embodiments by for instance Reducing the size of stored CSI by discarding the second representation of the CSI while keeping the first, or Transmitting, over a bandlimited FH, the first representation of the CSI at time instant 1 and then at a subsequent time instant transmit the second representation of the CSI.

Figure 4A:
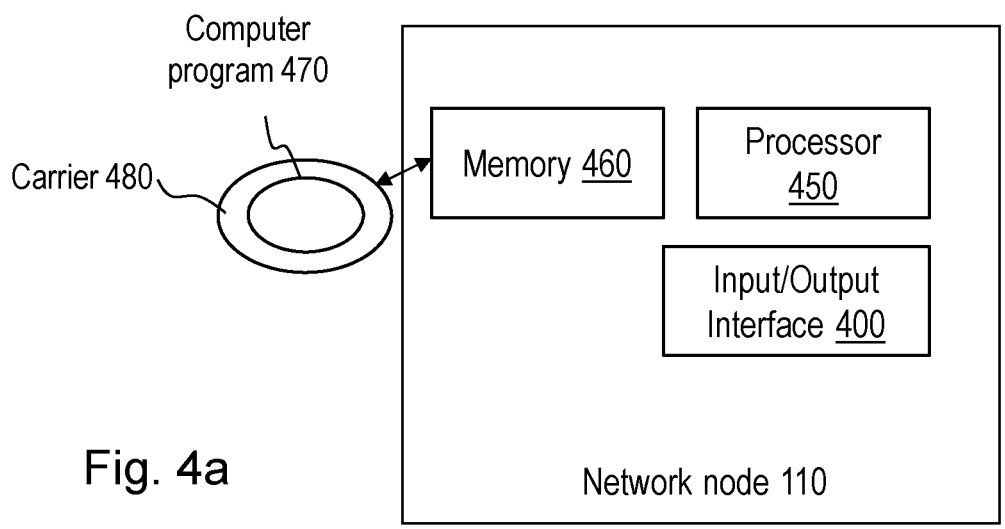
FIGS. 4 *a* and *b* are schematic block diagrams depicting embodiments of a network node.
Figure 4B:
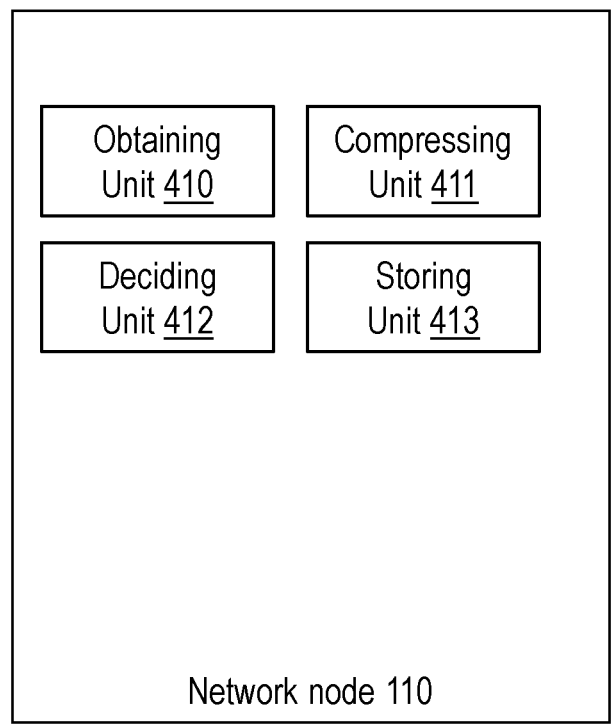

To perform the action as mentioned above, the network node 110 may comprise the arrangement as shown in FIGS. 4a and b. The network node 110 is configured to handle channel feature estimates associated with a radio channel between the UE 120 and the network node 110 in the wireless communications network.

The network node 110 may comprise a respective input and output interface 400 configured to communicate with the UE 120, see FIG. 4a. The input and output interface 400 may comprise a wireless receiver (not shown) and a wireless transmitter (not shown).

The network node 110 may further be configured to, e.g. by means of an obtaining unit 410 in the network node 110, obtain one or more channel feature estimates associated with the radio channel estimated at a first point in time, wherein data representing the one or more channel feature estimates is adapted to have a first size.

The network node 110 may further configured to, e.g. by means of the obtaining unit 410 in the network node 110, obtain the one or more channel feature estimates by any one out of: Receiving the one or more channel feature estimates from the UE 120, or estimating the one or more channel features of a signal from the UE 120.

The network node 110 may further be configured to, e.g. by means of an compressing unit 411 in the network node 110, at each of one or more successive points in time, compress the one or more channel feature estimates at the first point in time by replacing them with updated one or more channel feature estimates that at the subsequent point in time is adapted to fulfil a respective threshold condition. Data representing the updated one or more channel feature estimates is adapted to have a second size. The second size is adapted to be smaller than the first size. The respective threshold is adapted to reflect any one or more out of:

A gradual aging of the one or more channel features,
  a probability that the UE 120 will be scheduled within a time limit for the radio channel, and
  an available bandwidth at a FH, of the network node 110.

The respective threshold may further be adapted to reflect a probability that the UE 120 will be scheduled within a time limit for the radio channel.

The one or more successive points in time may be arranged to occur when any one or more out of:
  Being triggered at periodically subsequent points in time,
  a RRC state transition of the UE 120 is performed,
  a UE timer related to the age of the channel estimate is exceeded, and
  a remaining space on the storage is below a threshold.

The at least one of the respective threshold conditions may be adapted to be represented by any one out of: Exceeding a power threshold, or being below a bandwidth limit for transmitting the updated channel feature estimates from a RU, to a BU, over a front haul in the network node 110.

The network node 110 may further be configured to e.g. by means of the compressing unit 411 in the network node 110, compress the one or more channel feature estimates by replacing them by:
  Dividing the one or more channel feature estimates at the first point in time in two or more parts,
  replacing the one or more channel feature estimates at the first point in time with the first part that at the subsequent points in time fulfils the threshold condition and at the subsequent point in time sending the first part of the channel feature estimates over the front haul, and
  replacing the first part with the second part that at the subsequent point in time fulfils the threshold condition and at a third point in time sending the second part of the channel feature estimates over the front haul.

The network node 110 may further be configured to, e.g. by means of an deciding unit 412 in the network node 110, decide whether or not to adjust parameters for a transmission at the radio channel based on the updated one or more channel feature estimates.

The network node 110 may further be configured to, e.g. by means of an storing unit 413 in the network node 110, store the one or more channel feature estimates adapted to be estimated at the first point in time in a storage, and may further be configured to, e.g. by means of the compressing unit 411 in the network node 110, compress the one or more channel feature estimates by replacing the one or more channel feature estimates arranged to be stored in the storage with the updated one or more channel feature estimates that at the subsequent points in time is adapted to fulfil the respective threshold condition, which compression is adapted to result in a decreased storage volume requirement for the updated one or more channel feature estimates.

The embodiments herein may be implemented through a processor or one or more processors, such as a processor 450 of a processing circuitry in the network node 110 in FIG. 4*a*, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 460 comprising one or more memory units. The memory 460 comprises instructions executable by the processor 450 in the network node 110. The memory 460 is arranged to be used to store measurements, calculations, positions, requirements, information, data, configurations, threshold conditions, channel features, channel feature sizes, remaining space, channel features estimates and applications to perform the methods herein when being executed in the network node 110.

In some embodiments, a computer program 470 comprises instructions, which when executed by the at least one processor 450, cause the at least one processor 450 of the network node 110 to perform the actions above.

In some embodiments, a carrier 480 comprises the computer program 470, wherein the carrier 480 is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the network node 110 that when executed by the one or more processors such as the processors or processor circuitry described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 5:
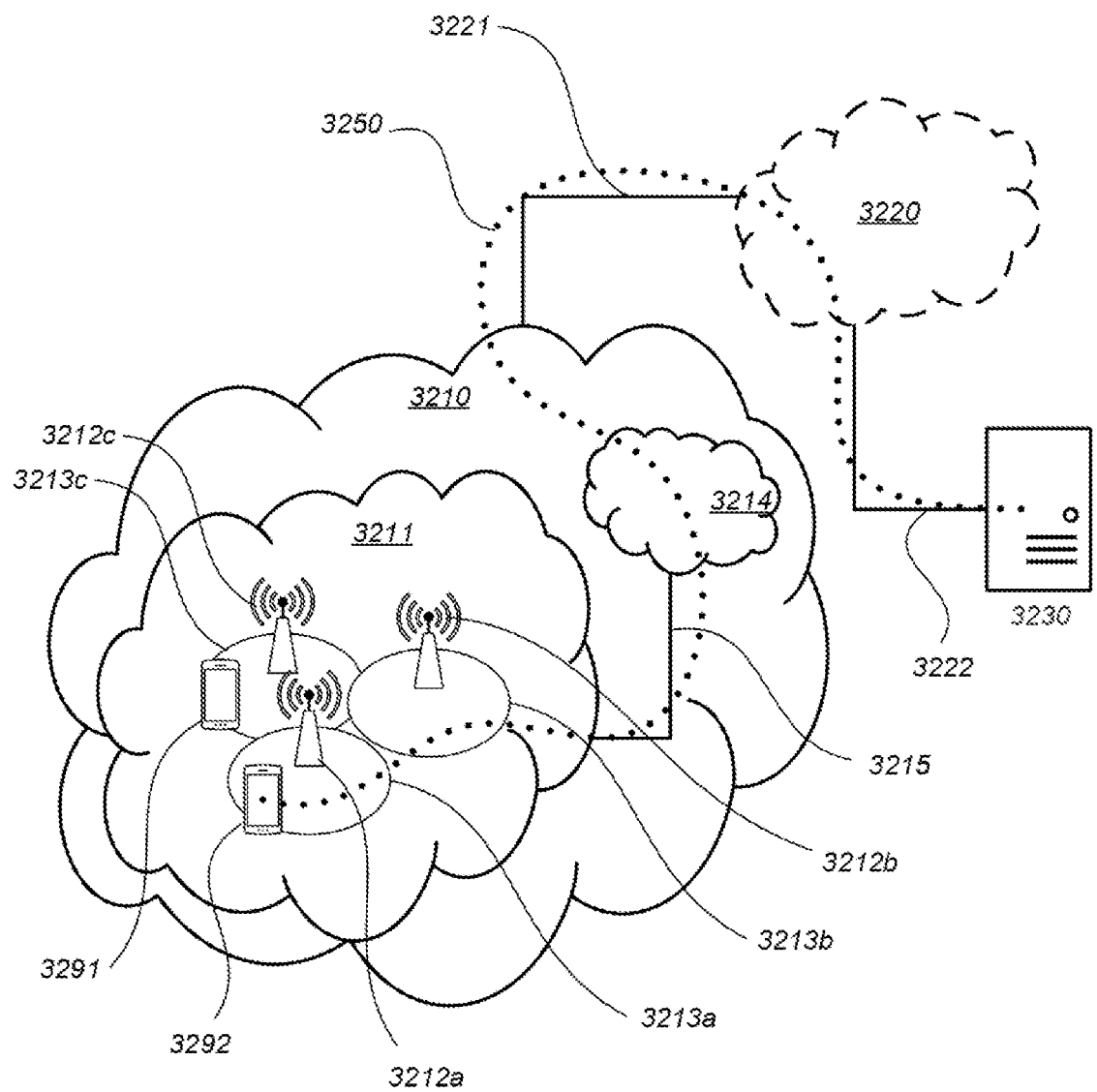
FIG. 5 schematically illustrates a telecommunication network connected via an intermediate network to a host computer.

With reference to FIG. 5, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 and 122 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 6) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 5, respectively. This is to say, the inner workings of these entities may be as shown in FIG. 6 and independently, the surrounding network topology may be that of FIG. 5.

Figure 6:
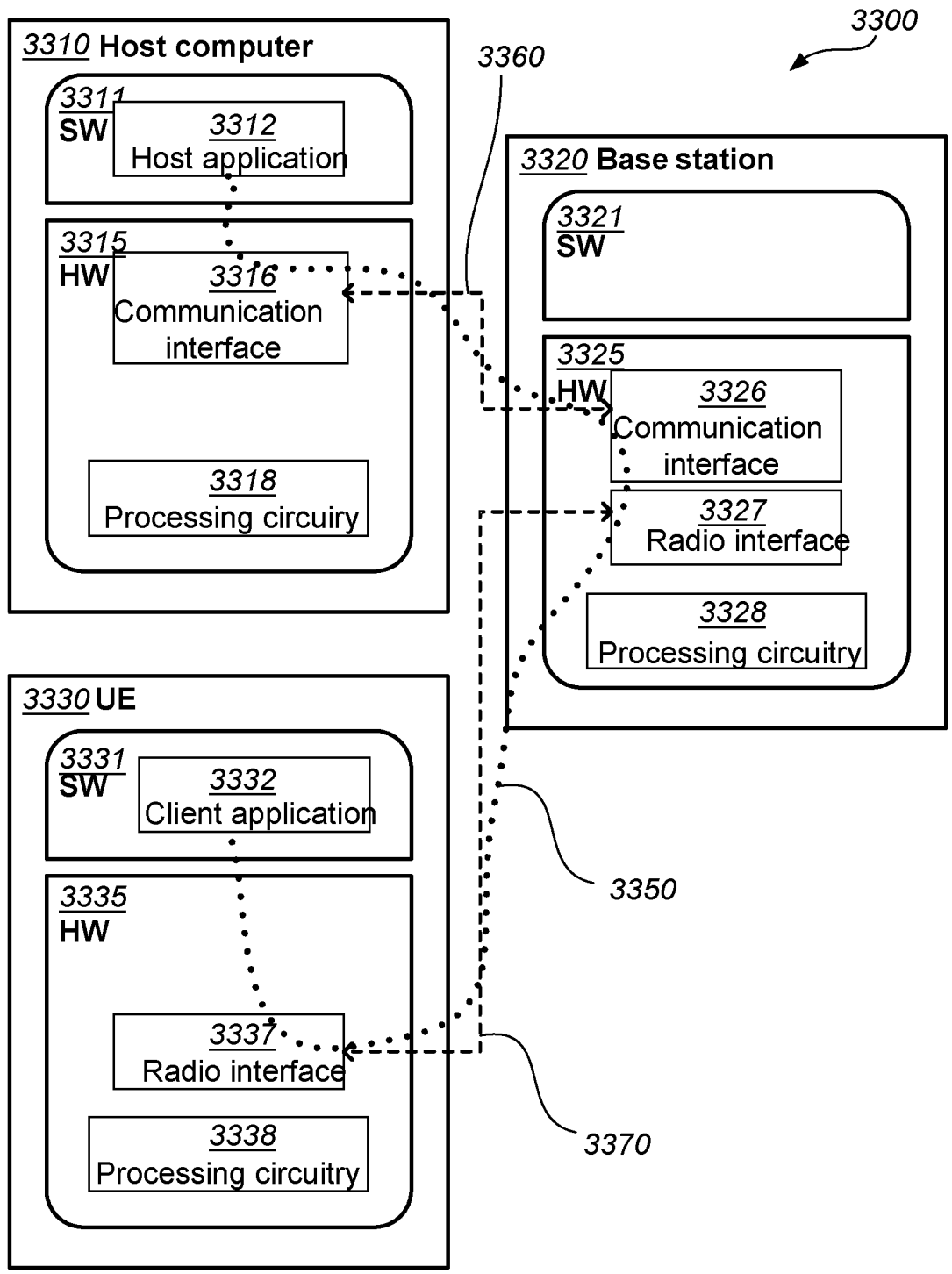
FIG. 6 is a generalized block diagram of a host computer communicating via a base station with a user equipment over a partially wireless connection.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 7, 8:
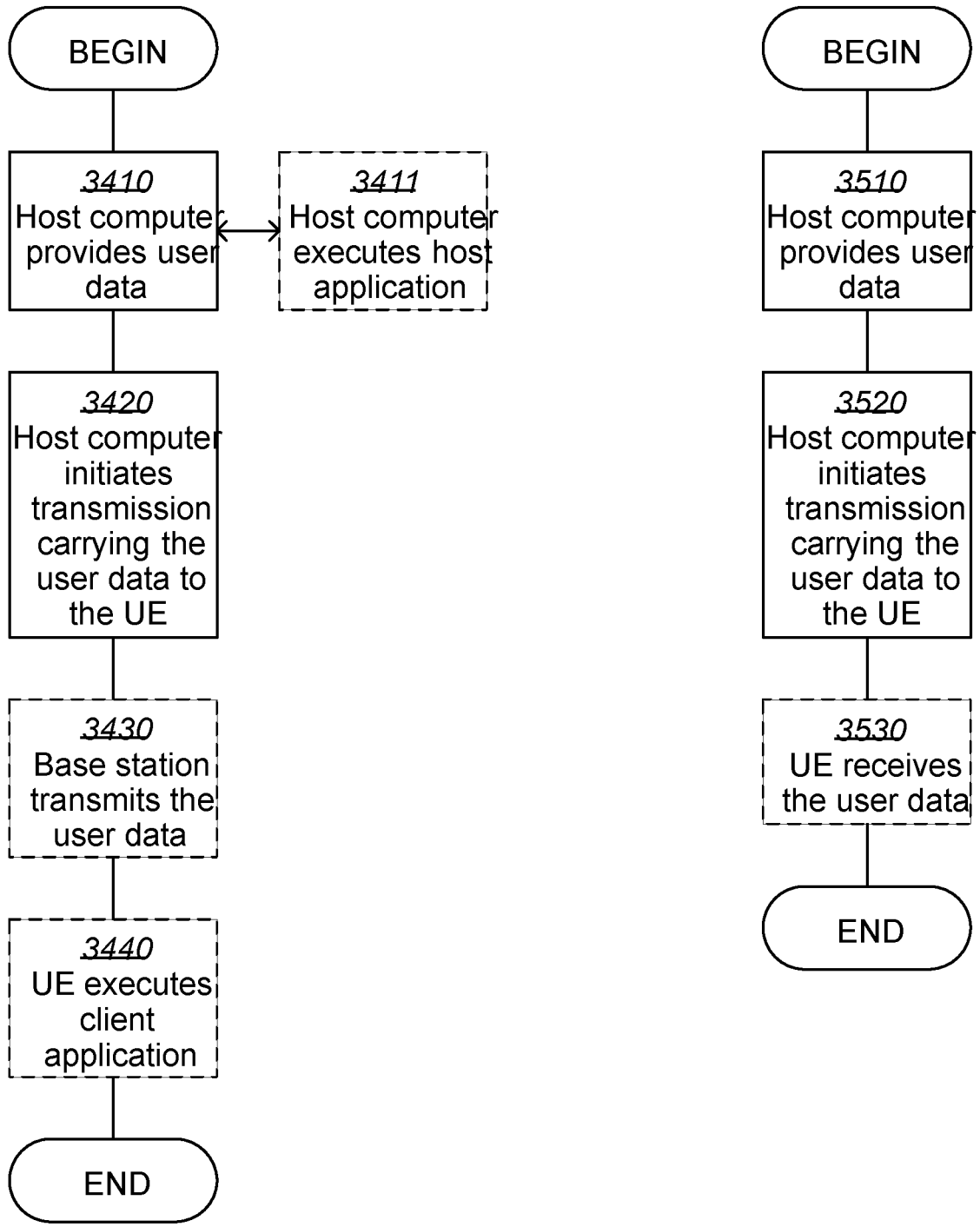

FIG. 7 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 8 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 9 will be included in this section. In an optional first action 3610 of the method, the UE receives input data provided by the host computer. Additionally, or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviations | |
| --- | --- |
| Abbreviation | Explanation |
| AAS | Active Antenna System |
| CPRI | Common Public Radio Interface |
| DFT | Discrete Fourier Transform |
| DM-RS | Demodulation Reference Signal |
| MIMO | Multiple-Input Multiple-Output |
| MSE | Mean Square Error |
| SVD | Singular Value Decomposition |
| ULA | Uniform Linear Array |

The invention claimed is:

1. A method performed by a network node for handling channel feature estimates associated with a radio channel between a User Equipment (UE), and the network node in a wireless communications network, the method comprising:
obtaining one or more channel feature estimates associated with the radio channel estimated at a first point in time, wherein data representing the one or more channel feature estimates has a first size,
at each of one or more successive points in time, compressing the one or more channel feature estimates at the first point in time by replacing them with updated one or more channel feature estimates that at the subsequent point in time fulfils a respective threshold condition, wherein data representing the updated one or more channel feature estimates has a second size, which second size is smaller than the first size, which respective threshold reflects any one or more out of:
- a gradual aging of the one or more channel features,
- a probability that the UE will be scheduled within a time limit for the radio channel, and
- an available bandwidth at a Front Haul (FH) of the network node; and
- adjusting parameters for a transmission at the radio channel based on the updated one or more channel feature estimates.

2. The method according to claim 1, wherein respective threshold reflects a gradual aging of the one or more channel features at the subsequent point in time, the method further comprising:
- storing the one or more channel feature estimates estimated at the first point in time in a storage, and wherein
- compressing the one or more channel feature estimates by replacing them is performed by: replacing the one or more channel feature estimates stored in the storage with the updated one or more channel feature estimates that at the subsequent points in time fulfils the respective threshold condition, resulting in a decreased storage volume requirement for the updated one or more channel feature estimates.

3. The method according to claim 2, wherein respective threshold further reflects a probability that the UE will be scheduled within a time limit for the radio channel.

4. The method according to claim 1, wherein obtaining the one or more channel feature estimates is performed by any one out of:
- receiving the one or more channel feature estimates from the UE, or
- estimating the one or more channel features of a signal from the UE.

5. The method according to claim 1, wherein the one or more successive points in time occurs when any one or more out of:
- being triggered at periodically subsequent points in time,
- a Radio Resource Control (RRC) state transition of the UE is performed,
- a timer related to the age of the channel estimate to the UE is exceeded, and
- a remaining space on the storage is below a threshold.

6. The method according to claim 1, wherein at least one of the respective threshold conditions is represented by any one out of:
- exceeding a power threshold, and
- being below a bandwidth limit for transmitting the updated channel feature estimates from a Radio Unit (RU) to a Baseband Unit (BU) over a fronthaul in the network node.

7. The method according to claim 1, wherein at least one of the respective threshold condition is represented by a bandwidth limit for transmitting the updated channel feature estimates from a Radio Unit (RU) to a Baseband Unit (BU) over a fronthaul in the network node and wherein:
- compressing the one or more channel feature estimates by replacing them is performed by:
- dividing the one or more channel feature estimates at the first point in time in two or more parts,
- replacing the one or more channel feature estimates at the first point in time with the first part that at the subsequent points in time fulfils the threshold condition and at the subsequent point in time sending the first part of the channel feature estimates over the fronthaul, and
- replacing the first part with the second part that at the subsequent point in time fulfils the threshold condition and at a third point in time sending the second part of the channel feature estimates over the fronthaul.

8. A computer program, stored on a non-transitory computer-readable medium, the computer program comprising instructions, which when executed by a processor, causes the processor to perform actions according to claim 1.

9. A network node configured to handle channel feature estimates associated with a radio channel between a User Equipment (UE) and the network node in a wireless communications network, the network node being further configured to:
- obtain one or more channel feature estimates associated with the radio channel estimated at a first point in time, wherein data representing the one or more channel feature estimates is adapted to have a first size,
- at each of one or more successive points in time, compress the one or more channel feature estimates at the first point in time by replacing them with updated one or more channel feature estimates that at the subsequent point in time is adapted to fulfil a respective threshold condition, wherein data representing the updated one or more channel feature estimates is adapted to have a second size, which second size is adapted to be smaller than the first size, which respective threshold is adapted to reflect any one or more out of:
- a gradual aging of the one or more channel features,
- a probability that the UE will be scheduled within a time limit for the radio channel, and
- an available bandwidth at a Front Haul (FH) of the network node; and
- adjust parameters for a transmission at the radio channel based on the updated one or more channel feature estimates.

10. The network node according to claim 9, wherein respective threshold is adapted to reflect a gradual aging of the one or more channel features at the subsequent point in time, the network node being further configured to:
- store the one or more channel feature estimates adapted to be estimated at the first point in time in a storage, and
- compress the one or more channel feature estimates by replacing the one or more channel feature estimates arranged to be stored in the storage, with the updated one or more channel feature estimates that at the subsequent points in time is adapted to fulfil the respective threshold condition, which compression is adapted to result in a decreased storage volume requirement for the updated one or more channel feature estimates.

11. The network node according to claim 10, wherein respective threshold further is adapted to reflect a probability that the UE will be scheduled within a time limit for the radio channel.

12. The network node according to claim 9, further being configured to obtain the one or more channel feature estimates by any one out of:
- receiving the one or more channel feature estimates from the UE, or
- estimating the one or more channel features of a signal from the UE.

13. The network node according to claim 9, wherein the one or more successive points in time is arranged to occur when any one or more out of:
- being triggered at periodically subsequent points in time,
- a Radio Resource Control (RRC) state transition of the UE is performed, a UE timer related to the age of the channel estimate is exceeded, and a remaining space on the storage is below a threshold.

14. The network node according to claim 9, wherein at least one of the respective threshold conditions is adapted to be represented by any one out of:

exceeding a power threshold, or being below a bandwidth limit for transmitting the updated channel feature estimates from a Radio Unit (RU) to a Baseband Unit (BU) over a fronthaul in the network node.

15. The network node according to claim 9, wherein at least one of the respective threshold condition is adapted to be represented by a bandwidth limit for transmitting the updated channel feature estimates from a Radio Unit (RU) to a Baseband Unit (BU) over a fronthaul in the network node, the network node being further configured to:

compress the one or more channel feature estimates by replacing them is to be performed by:

dividing the one or more channel feature estimates at the first point in time in two or more parts, replacing the one or more channel feature estimates at the first point in time with the first part that at the subsequent points in time fulfils the threshold condition and at the subsequent point in time sending the first part of the channel feature estimates over the fronthaul, and replacing the first part with the second part that at the subsequent point in time fulfils the threshold condition and at a third point in time sending the second part of the channel feature estimates over the fronthaul.

* * * * *